US009558432B2

(12) United States Patent
Tanaka

(10) Patent No.: US 9,558,432 B2
(45) Date of Patent: Jan. 31, 2017

(54) BUFFER MANAGEMENT TECHNOLOGY IN IMAGE FORMING APPARATUS

(71) Applicant: Konica Minolta, Inc., Chiyoda-ku, Tokyo (JP)

(72) Inventor: Kazuto Tanaka, Ichikawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/658,828

(22) Filed: Mar. 16, 2015

(65) Prior Publication Data

US 2015/0269463 A1    Sep. 24, 2015

(30) Foreign Application Priority Data

Mar. 19, 2014    (JP) .................................. 2014-056312

(51) Int. Cl.
*G06K 15/00* (2006.01)
*G06K 15/02* (2006.01)
*G06F 3/12* (2006.01)

(52) U.S. Cl.
CPC ....... *G06K 15/1817* (2013.01); *G06K 15/1886* (2013.01)

(58) Field of Classification Search
CPC ................. H04N 2201/3288; H04N 2201/329; H04N 1/32491; H04N 1/32443; H04N 1/32502
USPC ..... 358/1.1, 1.9, 1.13, 0.14, 1.15, 1.16, 1.18
See application file for complete search history.

(56) References Cited

U.S. PATENT DOCUMENTS

| 5,317,727 A | * | 5/1994 | Tsuchida | ............. | G06F 17/3048 |
| | | | | | 707/704 |
| 5,706,103 A | | 1/1998 | Matoba et al. | | |
| 7,042,582 B1 | * | 5/2006 | Shima | .................... | G06K 15/00 |
| | | | | | 358/1.13 |

(Continued)

FOREIGN PATENT DOCUMENTS

| JP | 05-284270 A | 10/1993 |
| JP | 07-322075 A | 12/1995 |

(Continued)

OTHER PUBLICATIONS

Japanese Office Action with English translation corresponding to Japanese Patent Application No. 2014-056312, dated Feb. 23, 2016; 16 pages.

(Continued)

*Primary Examiner* — Gabriel Garcia
(74) *Attorney, Agent, or Firm* — Buchanan Ingersoll & Rooney PC

(57) ABSTRACT

An image forming apparatus having a second storage device such as an HDD mounted thereon, when it receives an input of a job, determines a necessity of an input processing of image data into the second storage device, a necessity of an output processing of image data from the secondary storage device, and a timing of the input processing and the output processing in the job. Then, the image forming apparatus switches an output buffer, which is an area set in a primary storage of the image forming apparatus and is used for the output processing of image data from the secondary storage device, to a buffer for use in the input processing or to a buffer for use in the output processing in accordance with a result of the determination.

21 Claims, 7 Drawing Sheets

(56) References Cited

U.S. PATENT DOCUMENTS

2003/0011821 A1* 1/2003 Obata ................ H04N 1/00933
  358/1.16

FOREIGN PATENT DOCUMENTS

| | | |
|---|---|---|
| JP | 2001-016462 A | 1/2001 |
| JP | 2003-198817 A | 7/2003 |
| JP | 2006-150835 A | 6/2006 |
| JP | 2006-174247 A | 6/2006 |
| JP | 2006-295546 A | 10/2006 |

OTHER PUBLICATIONS

Office Action (Notice of Grounds of Rejection) issued on Jun. 14, 2016, by the Japanese Patent Office in corresponding Japanese Patent Application No. 2014-056312, and with an English translation. (21 pages).

* cited by examiner

FIG.3

| | | NEXT JOB | | | | |
|---|---|---|---|---|---|---|
| | | INPUT PROCESSING ONLY (ScanToBox) | INPUT/OUTPUT PROCESSING (OTHER THAN FAX RECEPTION) | INPUT/OUTPUT PROCESSING (FAX RECEPTION) | OUTPUT PROCESSING AFTER INPUT PROCESSING (COPY BOOKLET) | OUTPUT PROCESSING ONLY (BoxToPrint) |
| JOB BEING EXECUTED | INPUT PROCESSING ONLY (ScanToBox) | FOR USE IN INPUT PROCESSING (RELEASE AFTER TRANSFER PROCESSING) | FOR USE IN INPUT PROCESSING (RELEASE AFTER TRANSFER PROCESSING) | FOR USE IN INPUT PROCESSING (ALTERNATELY BY ONE PAGE) | FOR USE IN INPUT PROCESSING (RELEASE AFTER TRANSFER PROCESSING) | FOR USE IN INPUT PROCESSING (RELEASE AFTER TRANSFER PROCESSING) |
| | INPUT/OUTPUT PROCESSING (OTHER THAN FAX RECEPTION) | FOR USE IN OUTPUT PROCESSING | FOR USE IN OUTPUT PROCESSING | FOR USE IN OUTPUT PROCESSING | FOR USE IN OUTPUT PROCESSING | FOR USE IN OUTPUT PROCESSING |
| | INPUT/OUTPUT PROCESSING (FAX RECEPTION) | FOR USE IN OUTPUT PROCESSING | FOR USE IN OUTPUT PROCESSING | FOR USE IN INPUT PROCESSING (ALTERNATELY BY ONE PAGE) | FOR USE IN OUTPUT PROCESSING | FOR USE IN OUTPUT PROCESSING |
| | OUTPUT PROCESSING AFTER INPUT PROCESSING (COPY BOOKLET) | FOR USE IN INPUT PROCESSING (RELEASE AFTER JOB PROCESSING) | FOR USE IN INPUT PROCESSING (RELEASE AFTER JOB PROCESSING) | FOR USE IN INPUT PROCESSING (RELEASE AFTER JOB PROCESSING) | FOR USE IN INPUT PROCESSING (RELEASE AFTER JOB PROCESSING) | FOR USE IN INPUT PROCESSING (RELEASE AFTER JOB PROCESSING) |
| | OUTPUT PROCESSING ONLY (BoxToPrint) | FOR USE IN OUTPUT PROCESSING | FOR USE IN OUTPUT PROCESSING | FOR USE IN OUTPUT PROCESSING | FOR USE IN OUTPUT PROCESSING | FOR USE IN OUTPUT PROCESSING |

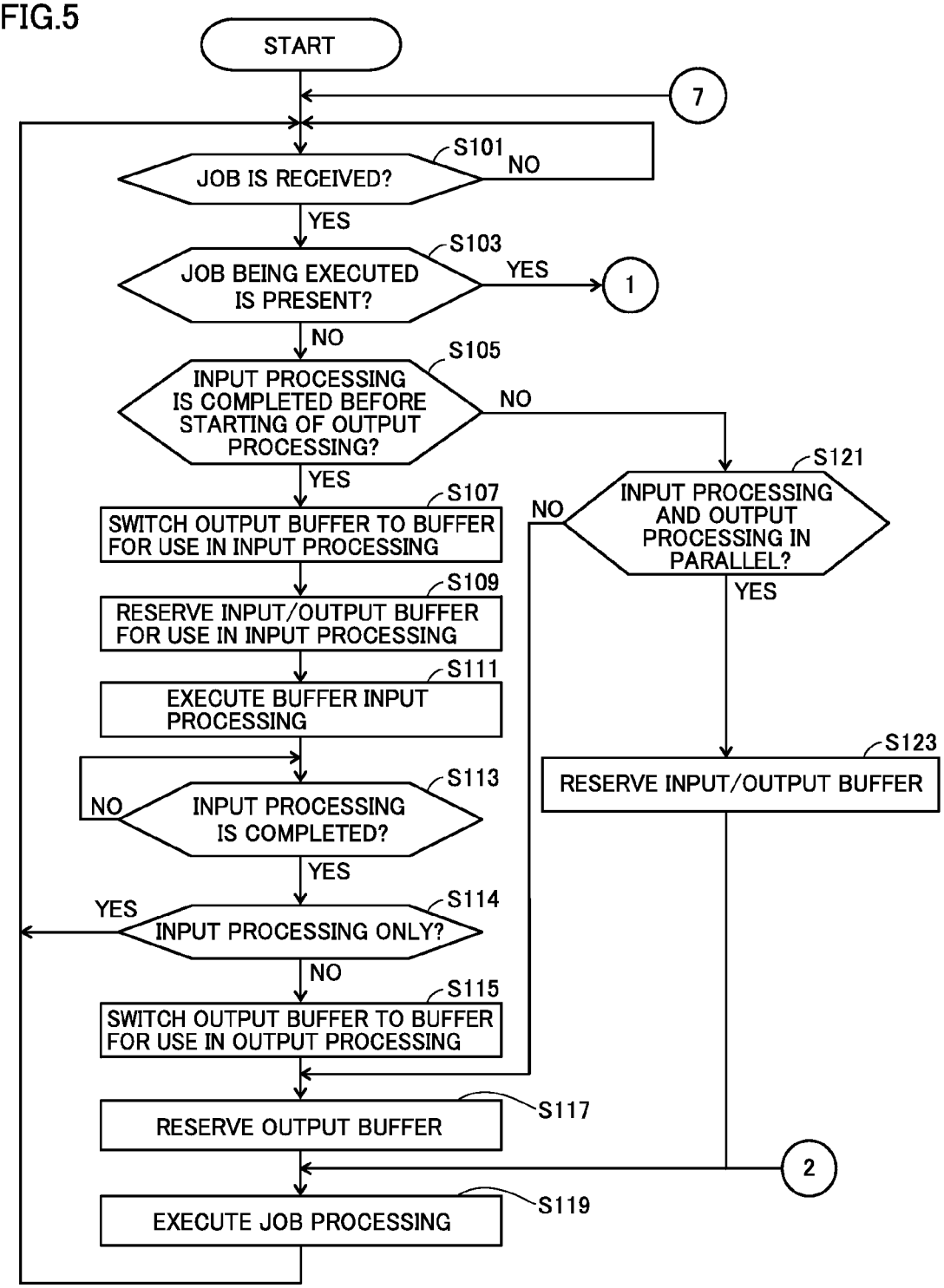

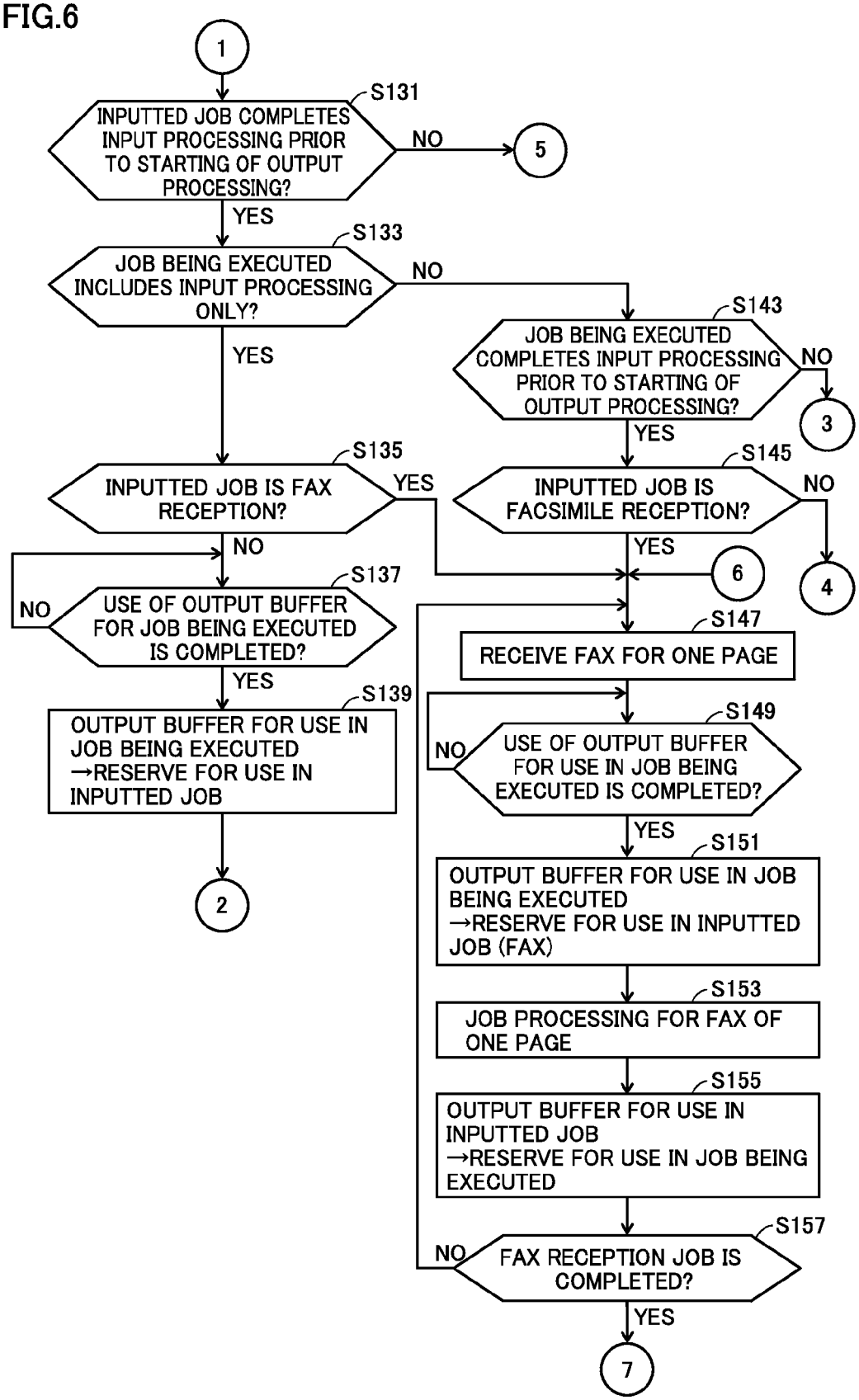

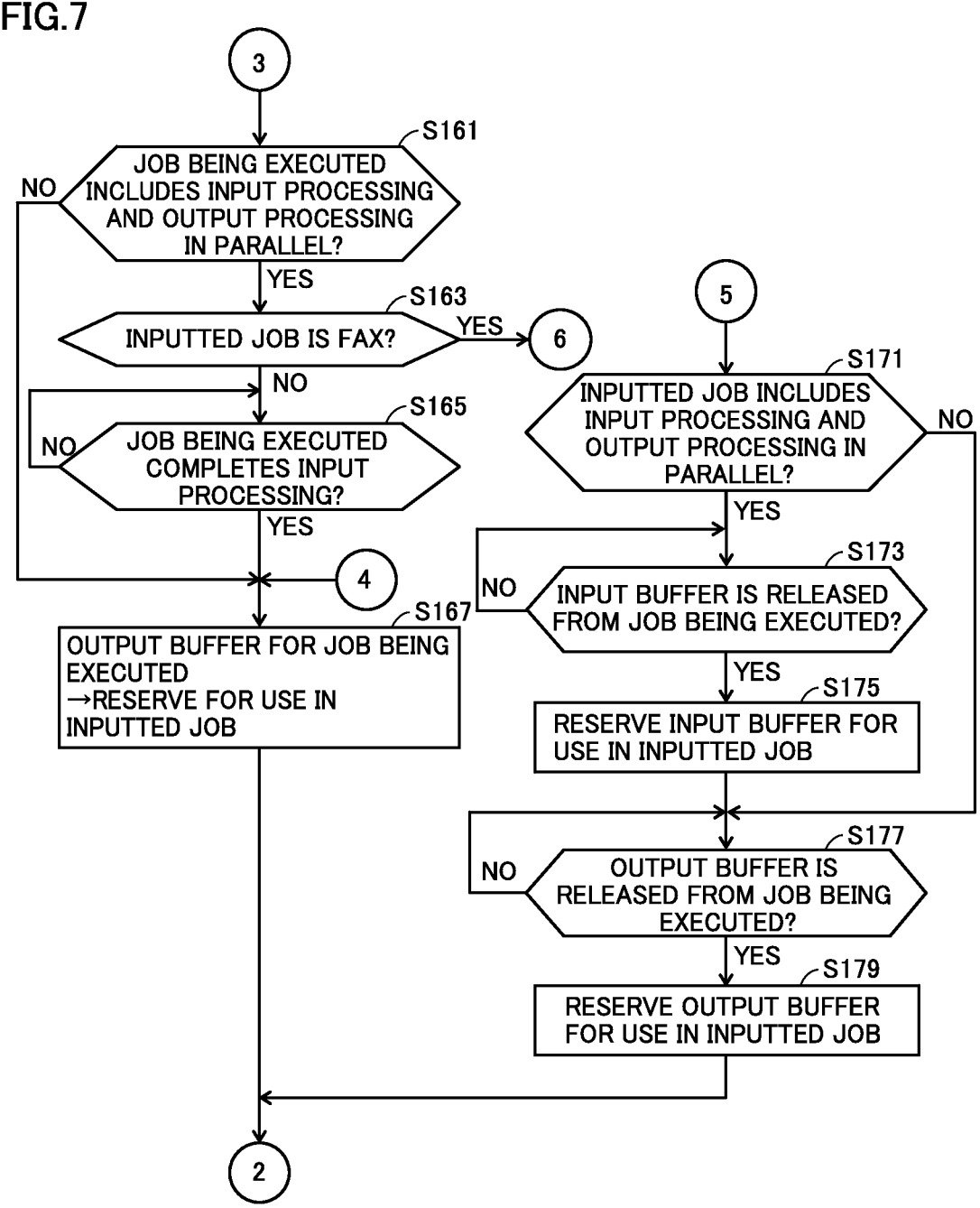

BUFFER MANAGEMENT TECHNOLOGY IN IMAGE FORMING APPARATUS

This application is based on Japanese Patent Application No. 2014-056312 filed with the Japan Patent Office on Mar. 19, 2014, the entire content of which is hereby incorporated by reference.

BACKGROUND OF THE INVENTION

Field of the Invention

The present disclosure relates to an image forming apparatus and a controlling method, more particularly to an image forming apparatus having a mass storage device as a secondary storage device and a method for controlling the image forming apparatus.

Description of the Related Art

There has been a processing device provided with a mass storage device such as an HDD (Hard Disk Drive), an SSD (Solid State Drive), or the like as a secondary storage device. Such a processing device accesses a primary storage, which is also referred to as a main memory, when it stores and reads data into and from a mass storage device which is a secondary storage device. In other words, the processing device reserves a storing buffer in the main memory when it stores data into the mass storage device, and reserves a reading buffer when it reads data from the mass storage device. Further, there has been a known technique of using a reading buffer of a main memory as a second storing buffer and using a regular storing buffer and the second storing buffer as toggle buffers to increase a storage speed when data is to be stored into a mass storage device.

For example, operations of an image forming apparatus include an operation of performing image forming for printing after completing reading of all pages of a document. The operation described above may be, for example, so-called booklet printing of arranging image data of each page such that a booklet can be obtained when printed objects are stacked and valley-folded in a lengthwise direction, printing of adding images such as page numbers associated with all of pages, or the like. When the image forming apparatus receives other print job before completion of an operation of reading a document, it can perform a printing operation for the print job in parallel with the operation of reading a document of the previous job. However, if the image forming apparatus performs the printing operation for the later print job in parallel with the reading operation for the previous job, the order of job processing becomes different from the order of job receiving. Therefore, the image forming apparatus is configured so as not to start processing of other job until the processing of the previous job is completed even when a next job is received before completion of the reading operation.

In this case, there has been a problem that the image forming apparatus becomes slow in the reading operation for the previous job and also becomes slow in starting of processing for the next job if the reading buffer of the main memory is not used as the second storing buffer in the operation of storing into the mass storage device the image data obtained by reading the previous job, in other words, if the toggle buffer method is not employed.

Therefore, application of the toggle buffer method to the image forming apparatus is considered.

If the image forming apparatus uses the toggle buffer method to execute Scan-To-Box (the operation of storing image data, which is obtained by executing a scanning operation, into the mass storage device), the reading buffer of the main memory is used as the second storing buffer in addition to the storing buffer. Accordingly, the storage speed of storing image data into the mass storage device can be increased.

During the execution of this operation, there is a case where an instruction of operation with reading from the mass storage device, such as Box-To-Print (the operation of reading image data from the memory device and printing the same), is given. In this case, the image forming apparatus already uses the reading buffer of the memory as the second storing buffer through the operation described above. Therefore, the image forming apparatus cannot start the reading operation with use of the reading buffer, such as the BOX-to-PRINT, until the reading buffer is provided, in other words, until the previous storing operation is completed. Therefore, there has been a problem that starting of the next printing is delayed.

SUMMARY OF THE INVENTION

In accordance with one embodiment, an image forming apparatus includes a primary storage device, a secondary storage device, an input unit capable of receiving an input of a job, and a controller. The controller executes determining a necessity of an input processing of image data into the secondary storage device, a necessity of an output processing of image data from the secondary storage device in the job, and a timing of the input processing and the output processing, and switching an output buffer, which is an area set in the primary storage and is used for an output processing of image data from the secondary storage device, to a buffer for use in the input processing or to a buffer for use in the output processing in accordance with a result of the determination of the determining.

Preferably, when the job requires the input processing and does not require the output processing, or when said completes the input processing prior to starting of the output processing, the switching includes switching of the output buffer to a buffer for use in the input processing at a time of starting the processing of the job.

Preferably, when an input of a next job is received during a processing of a job which requires the input processing and does not require the output processing, the switching further includes switching of the output buffer to a buffer for use in processing of the next job when the input processing having been performed with use of the output buffer at the time of reception of an input of the next job is completed.

Preferably, when an input of a next job is received during the processing of a job which completes the input processing prior to starting of the output processing, the switching further includes switching of the output buffer to a buffer for use in processing of the next job when a processing of a job being processed is completed.

Preferably, the input unit includes a facsimile receiving unit. When the next job is facsimile data, the switching includes switching of the output buffer to a buffer for use in processing of the next job at each time when one page of facsimile data is received by the facsimile receiving unit, and switching of the output buffer to a buffer for use in processing of the job being processed at each time when processing of one page is completed.

In accordance with another embodiment, the control method is a method for controlling an image forming apparatus. This image forming apparatus can perform a job processing with input and output of image data with respect to a secondary storage device. This control method includes the receiving an input of a job, determining a necessity of an input processing of image data into the secondary storage device, a necessity of an output processing of image data from the secondary storage device, and a timing of the input processing and the output processing in the job, and switching an output buffer, which is an set in the primary storage and is used for the output processing of the image data from the secondary storage device, to a buffer for use in the input processing or to a buffer for use in the output processing in accordance with a result of the determination in the determining.

In accordance with another embodiment, a non-transitory computer-readable storage medium stores a program for allowing a computer, which is mounted to an image forming apparatus capable of performing a job processing with input and output of image data into a secondary storage device, to execute a buffer switching processing. This program allows the computer to execute the receiving an input of a job, determining a necessity of an input processing of image data with respect to the secondary storage device and a necessity of an output processing of image data from the secondary storage device in the job, and a timing of the input processing and the output processing, and switching an output buffer, which is an area set in the primary storage and is used for an output processing of the image data from the secondary storage device, to a buffer for use in the input processing or to a buffer for use in the output processing in accordance with a result of the determination of the determining.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 represents a specific example of information defining a control of the output buffer for each kind of job.

FIGS. 5 to 7 are flowcharts representing a specific example of a flow of operation in the MFP.

DESCRIPTION OF THE PREFERRED EMBODIMENT

Figure 1:
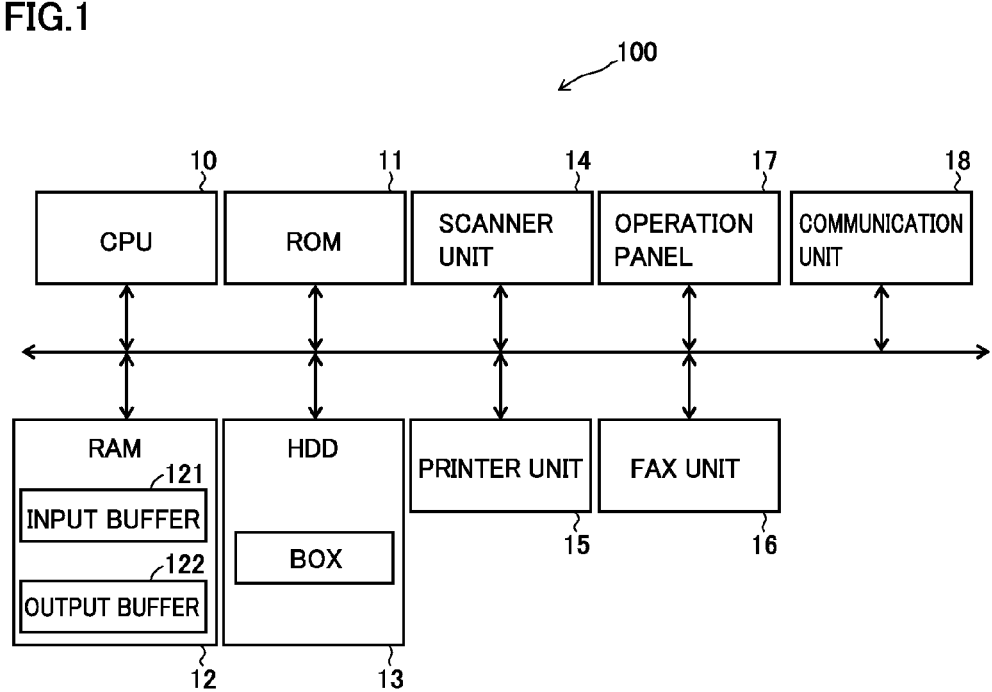
FIG. 1 is a block diagram representing a specific example of a device configuration of an MFP (Multi-Functional Peripheral) as one example of an image forming apparatus according to the embodiment.

In the following, the embodiment of the present invention will be described with reference to the drawings. In the following description, the same parts or components have the same reference numerals allotted. Names and functions of those are also the same. Thus, description thereof will not be repeated.

<Device Configuration>

FIG. 1 is a block diagram representing a specific example of the device configuration of an MFP (Multi-Functional Peripheral) 100 as one example of the image forming apparatus according to the present embodiment. Referring to FIG. 1, MFP 100 includes a CPU (Central Processing Unit) 10 for controlling the entire apparatus, an ROM (Read Only Memory) 11 as a memory for storing a program executed by CPU 10, an RAM (Random Access memory) 12 which is a memory serving as a working area for execution of the program by CPU 10 and stores various information, and an HDD (Hard Disk Drive) 13 as one example of a storage device for storing image data and the like. Moreover, MFP 100 includes a scanner unit 14, a printer unit 15, a facsimile (FAX) unit 16, an operation panel 17, and a communication unit 18 for communicating with other device such as other PC (personal computer).

RAM 12 corresponds to a primary storage device (or a main memory unit). On the other hand, HDD 13 corresponds to a secondary storage device. Data passes through RAM 12 when it is outputted from or inputted to HDD 13. In other words, RAM 12 includes an input buffer 121 and an output buffer 122. Input buffer 121 is a primary buffer which is used when data is inputted to HDD 13. Output buffer 122 is a primary buffer which is used when data is outputted from HDD 13.

It should be noted that the image forming apparatus according to the present embodiment is all necessary to be an apparatus to which a secondary storage device such as an HDD is mounted. The image forming apparatus may be other device of the MFP, such as a printer or a scanner. Moreover, the secondary storage device is not limited to an HDD, and it may be, for example, an SSD (Solid State Drive) or other storage device.

<Summary of Operation>

Figure 2:
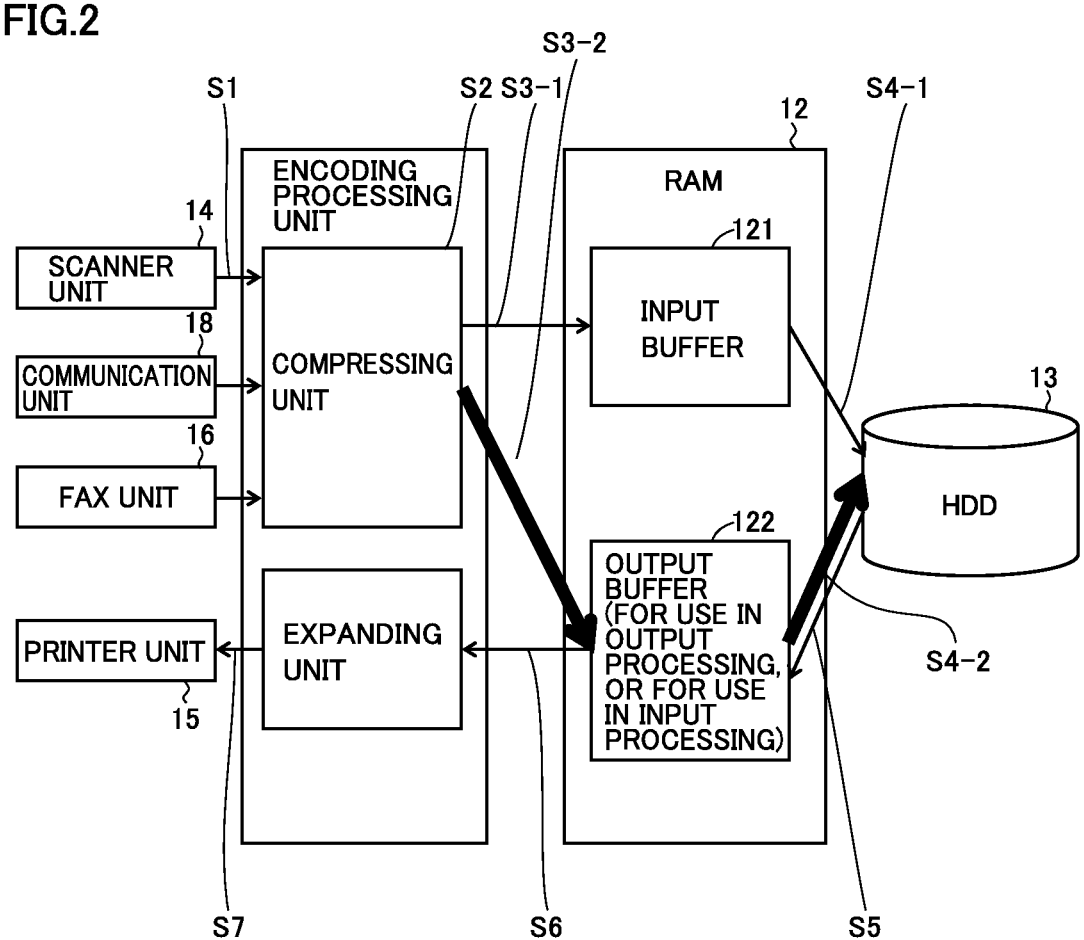
FIG. 2 is a diagram for explanation of a flow of input and output of coded data of input data with respect to a secondary storage device in the MFP.

FIG. 2 is a diagram for explanation of a summary of operation of MFP 100 at the time of inputting and outputting coded data of input data (for example, image data) with respect to HDD 13 which is a secondary storage device.

Referring to FIG. 2, MFP 100 scans a document by scanner unit 14 or receives image data from a PC or the like through communication unit 18 to obtain image data (Step S1). The image data is included in a job, and it may be, for example, a subject of a print processing or a subject of a transfer to other device.

MFP 100 encodes (compression: Step S2) obtained data. MFP 100 transfers the coded data to input buffer 121 which is a primary buffer memory for input of data to HDD 13 (Step S3-1). After transferring the coded data to input buffer 121, MFP 100 transfers the coded data from input buffer 121 to HDD 13 (Step S4-1). MFP 100 repeats Step S3-1 and Step S4-1. In this manner, MFP 100 stores coded data for one page into HDD 13.

Next, when reading the coded data from HDD 13, MFP 100 repeats the operation of transferring the coded data from HDD 13 to output buffer 122 which is a primary buffer memory for output of data from HDD 13 (Step S5). In this manner, MFP 100 reads coded data for one page. After the transfer of the coded data for one page to output buffer 122 is completed, MFP 100 performs a job processing. Specifically, MFP 100 reads the coded data from output buffer 122 and expands the same (Step S6). Then, MFP 100 delivers the expanded data to printer unit 15 (step S7).

At this time, when a kind of a job being processed is a job of performing only input (storing) to HDD 13 and not performing output (reading) from HDD 13 in parallel, or when it is a job of performing output (reading) from HDD 13 after completion of input (storing) to HDD 13, MFP 100 temporarily uses, in addition to input buffer 121, output buffer 122 as a primary buffer memory for input of data to HDD 13. In other words, MFP 100 in this case temporarily switches output buffer 122 to a buffer for use in an input processing.

The operation described above is indicated by the bold lines. In other words, MFP 100 in this case transfers the coded data to input buffer 121 (Step S3-1). Moreover, MFP 100 transfers the coded data also to output buffer 122 in parallel with the transfer to input buffer 121 (Step S3-2). Then, MFP 100 instructs these buffers 121, 122 to transfer the coded data to HDD 13. It represents the state where output buffer 122 is used as a toggle buffer for use in the input processing.

When the size of image data is large, there is a case where input buffer 121 cannot completely store coded data for whole one page. In this case, when only the transfer of coded data to HDD 13 through input buffer 121 is performed as described above (Steps S3-1, S4-1), the transfer operation is repeated for multiple times. Therefore, a time required to complete the transfer of coded data to HDD 13 becomes long.

On the other hand, when MFP 100 performs, for example, the transfer of coded data to HDD 13 through input buffer 121 (Steps S3-1, S4-1) and the transfer of coded data to HDD 13 through output buffer 122 (Steps S3-2, S4-2) alternately, the time required to complete the transfer to HDD 13 can be shortened considerably as compared to the case where only the transfer of coded data to HDD 13 through input buffer 121 is performed as described above (Steps S3-1, S4-1). Accordingly, MFP 100 can improve the processing performance.

On the other hand, when output buffer 122 is used for the input processing of coded data with respect to HDD 13, MFP 100 cannot use output buffer 122 for the output processing of coded data from HDD 13 during the input processing. For example, when a kind of the job being executed is a job of performing input (storing) to HDD 13 and output (reading) from HDD 13 in parallel, the processing of outputting (reading) from HDD 13 is not started until the input processing to HDD 13 is completed and output buffer 122 is switched to a buffer for use in the output processing. Therefore, a time required for completing the job processing becomes long. In other words, in the case of a job which requires starting of the output processing prior to the completion of the input processing, execution of the transfer of coded data to HDD 13 through output buffer 122 (Step S3-2, S4-2) may on the contrary lower the processing performance.

Therefore, MFP 100 according to the present embodiment determines a necessity of the input processing, a necessity of the output processing in the job subjected to the processing, and switches the output buffer to a buffer for use in the input processing or a buffer for use in the output processing in accordance with a result of the determination. Specifically, when the job requires the input processing and does not require the output processing, or when the job completes the input processing prior to the starting of the output processing, MFP 100 switches output buffer 122 to a buffer for use in the input processing at the time of starting the processing of the job.

To perform this control, MFP 100 stores in advance information defining a control of output buffer 122 for each kind of job as shown in FIG. 3 for example. This information may be in a table format as shown in FIG. 3 or in other format. Moreover, the information may be registered or updated by a certain user such as an administrator.

Referring to FIG. 3, MFP 100 stores, in advance, the control to switch output buffer 122 to a buffer for use in the input processing at the time of starting the job processing, when the job subjected to the processing is an operation of storing into HDD 13 image data obtained by performing a scanning operation, which is so-called Scan-To-Box, or a job with only an input processing with respect to HDD 13 (a job without an output processing). Moreover, MFP 100 also stores, in advance, the control to switch output buffer 122 to a buffer for use in the input processing at the time of starting the job processing, in the case of a job of starting the output processing after completion of the input processing, such as so-called a copy booklet. The copy booklet represents the operation of scanning each page of a document in advance to obtain image data, arranging the image data for each page such that a booklet can be obtained when printed objects are stacked and valley-folded in a lengthwise direction, and printing the same. As another example of the job of starting the output processing after the completion of the input processing, there is a job with an operation of obtaining image data by scanning each page of a document, adding images with the total page number (for example, an image representing each page number in a fraction form), and printing the same.

When jobs of the kinds described above are processed, output buffer 122 is switched to a buffer for use in the input processing in accordance with the information shown in FIG. 3, so that a time required for the processing of inputting (storing) image data into HDD 13 can be shortened considerably as compared to the case of using only input buffer 121, and the processing performance can be improved.

On the other hand, MFP 100 stores, in advance, the control to switch output buffer 122 to a buffer for use in the output processing at the time of starting the job processing, when the job subjected to the processing is a job of performing the input processing and the output processing in parallel, in other words, when it is the job of starting the output processing prior to the completion of the input processing. Moreover, MFP 100 stores, in advance, the control to switch output buffer 122 to a buffer for use in the output processing at the time of starting the job processing, when it is an operation of reading image data stored in HDD 13 and printing the same, which is so-called Box-To-Print, or a job with only an output processing from HDD 13 (a job without an input processing).

When the jobs of the kinds described above are processed, output buffer 122 is switched to a buffer for use in the output processing in accordance with the information shown in FIG. 3, so that starting of the operation of outputting (reading) image data from HDD 13 can be made earlier. Accordingly, MFP 100 can improve the processing performance.

MFP 100 refers to the information when it receives a job subjected to the processing, and switches output buffer 122 to a buffer for use in the input processing or a buffer for use in the output processing.

Further, when a next job (next job) is received during execution of a job processing, and buffers 121, 122 are still remains to be buffers for use in the processing of the job being executed (job being processed), starting of the processing for the next job is delayed, which leads to lowering of the processing performance as a whole. Specifically, even for any kind of job being executed, when the input processing is present, input buffer 121 is not released from the job being executed until the transfer of image data from input buffer 121 to HDD 13 is completed in the processing of the job. On the other hand, if output buffer 122 is not released from the job being executed until the job being executed is completed when output buffer 122 is switched to a buffer for use the input processing in the job being executed, the output operation of the next job is not started until the processing of the job being executed is completed. Moreover, when the next job is a job of a kind which can be used by switching output buffer 122 to a buffer for use in the input processing as described above, a processing time of the input processing also becomes long.

Therefore, MFP 100 according to the present embodiment further switches output buffer 122 having been switched to a buffer for use in the input processing to a buffer for use in the processing of the job being executed or a buffer for use in the next job (release from a buffer for use in the job being executed) in accordance with the job being executed at the time of reception of the next job. In this case, MFP 100 according to the present embodiment also determines, in addition to a necessity of the input processing and the output processing for use in the job being executed and a timing of the input processing and the output processing, a necessity of the input processing and the output processing and a timing of the input processing and the output processing for the next job. Then, MFP 100 switches output buffer 122 in accordance with a result of the determination. To perform this control, MFP 100 stores in advance the job being executed, the next job, and the information defining the control of output buffer 122 for each kind of job.

Referring to FIG. 3, MFP 100 stores, in advance, the control to switch output buffer 122 to a buffer for use in the next job (releasing from the buffer for the job being executed) at the time of starting of the job processing, when the job being executed is a job of a kind which performs only the input processing and does not perform the output processing, and when the next job is a job of a kind other than the facsimile reception.

When the next job is a job of a kind other than the reception of facsimile, and output buffer 122 is released from the job being executed in accordance with the information of FIG. 3, output buffer 122 can be used for the processing of the next job at the time when all of data transferred to output buffer 122 in the job being executed is transferred to HDD 13. Therefore, for example, when the next job is a job of only the input processing, or when it is a job which starts the output processing after the completion of the input processing, output buffer 122 can be switched to a buffer for use in the input processing of the next job. Moreover, when the next job is a job of only the output processing, or is a job of executing the output processing in parallel with the input processing, output buffer 122 can be switched to a buffer for use in the output processing of the next job. Accordingly, MFP 100 can start the processing of the next job even during the processing of the job being executed. In other words, MFP 100 can perform the multi-access, so that the processing performance can be improved as a whole.

On the other hand, MFP 100 stores, in advance, the control to switch output buffer 122 to a buffer for use in the next job after completion of the processing of the job being executed (released from the job being executed), when the job being executed is a job of a kind which starts the output processing after completion of the input processing, and when the next job is a job of a kind other than the facsimile reception.

When the job being executed is a job of a kind which starts the output processing after completion of the input processing, the transfer of the data of output buffer 122 being a buffer for the input processing to HDD 13 is completed at least at the time of completion of the input processing of the job being executed. Therefore, MFP 100 releases output buffer 122 at least at the time of completion of the input processing of the job being executed, and it can be also used as a buffer for the next job. However, when the processing of the next job is performed with use of output buffer 122 in parallel with the processing of the job being executed, there is a case where the processing of the next job is completed earlier than the job being executed. For example, in the case of a printing operation, there is a case where a printed object of the next job is outputted before the job being executed. In this case, it may confuse a user who thinks that a process result (for example, a printed object) is outputted in accordance with the order of providing a job. For example, there is a user providing the job being executed takes a printed object of the next job by mistake. Therefore, in this case, MFP 100 releases output buffer 122 from the job being executed and switches it to a buffer for use in the next job after completion of the processing of the job being executed as described above.

In the case where the job being executed is a job of a kind which starts the output processing after the completion of the input processing, when output buffer 122 is released from the job being executed after the completion of the processing of the job being executed, the situation where the order of the completion of the processing of the job is different from the order of providing a job can be prevented, so that confusion of the user can be avoided.

In the case where the next job is the facsimile reception, a time required by MFP 100 to obtain image data for one page is remarkably longer as compared to a time for obtaining image data from scanner unit 14, a time for obtaining image data from a PC through communication unit 18, and the like. Thus, in this case, referring to FIG. 3, MFP 100 stores, in advance, the control to switch output buffer 122 between a buffer for use in the job being executed and a buffer for use in the next job at each time the reception of facsimile for the next job is completed for one page. Specifically, to make the starting of the processing of the next job be earlier, MFP 100 switches output buffer 122 from a buffer for use in the job being executed to a buffer for use in the next job and uses it for the input processing of the next job after completion of reception of facsimile of the next job for one page and at the time of completion of the data transfer to HDD 13 from output buffer 122 having been used for the input processing of the job being executed. After that, when the transfer of data for one page of the next job to HDD 13 is completed, MFP 100 again releases output buffer 122 from a buffer of the next job and switches it to a buffer for use in the job being executed, and uses it for the input processing of the job being executed. After that, MFP 100 switches output buffer 122 between a buffer for use in the job being executed and a buffer for use in the next job at each time when reception of facsimile of the next job for one page is completed.

In the case where the next job is facsimile reception, output buffer 122 is switched between a buffer for use in the job being executed and a buffer for use in the next job, so that storing of the next job which is facsimile reception for one page to HDD 13 is performed in parallel with the input processing of the job being executed. Accordingly, MFP 100 can execute the processing of the job being executed and the processing of the next job which is the facsimile reception in parallel. In other words, the multi-access of MFP 100 can be performed, so that the processing performance can be improved as a whole.

<Functional Configuration>

Figure 4:
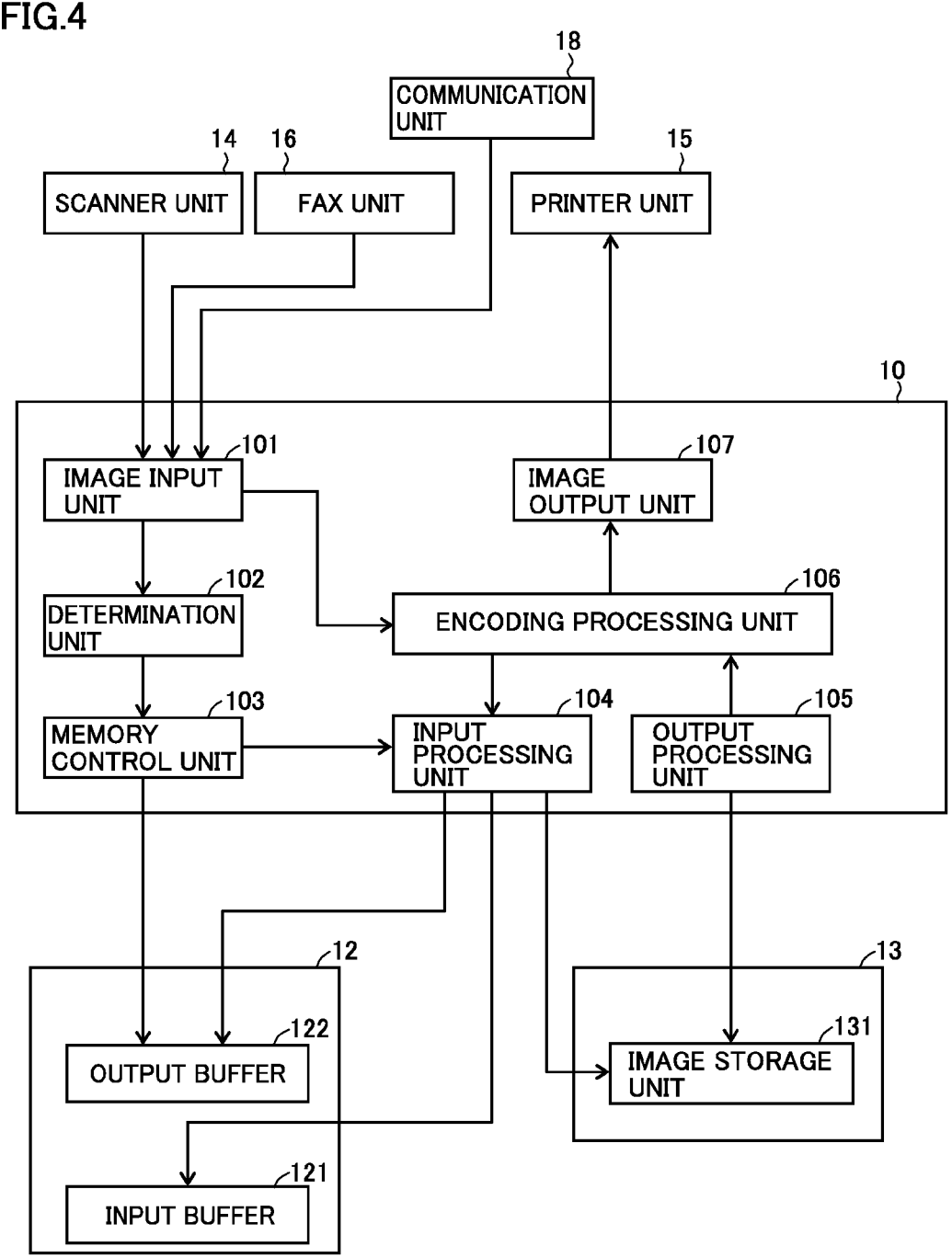
FIG. 4 is a block diagram representing a specific example of a functional configuration of the MFP.

FIG. 4 is a block diagram representing a specific example of the functional configuration of MFP 100 for performing the operations described above. Each function shown in FIG. 4 is achieved mainly by CPU 10 of MFP 100 reading the program stored in ROM 11 onto RAM 12 and executing the same. However, at least some of the functions can be achieved by other device configuration shown in FIG. 1 or by other hardware such as an electric circuit (not illustrate).

Referring to FIG. 4, CPU 10 of MFP 100 includes an image input unit 101, a determination unit 102, a memory control unit 103, an input processing unit 104, an output processing unit 105, an encoding processing unit 106 for performing an encoding processing, and an image output unit 107.

Image input unit 101 receives input of image data through a scanning operation by scanner unit 14, reception of image data from a PC or the like by communication unit 18, facsimile reception by a FAX unit 16, or the like.

Determination unit 102 determines a necessity of an input processing of image data with respect to HDD 13 which is the secondary storage device, a necessity of an output processing of image data from HDD 13, and a timing of the input processing and the output processing in the received job.

Memory control unit 103 performs a control of switching output buffer 122, which is set as a primary buffer in RAM 12 as a primary storage and is used for the output processing, to a buffer for use in the input processing or a buffer for use in the output processing in accordance with a result of the determination by determination unit 102.

Input processing unit 104 performs the processing of inputting coded data (image data) generated by encoding processing unit 106 to HDD 13 through the primary buffer and storing the same in HDD 13.

Output processing unit 105 performs the processing of outputting the coded data (image data) from HDD 13.

Image output unit 107 delivers image data, which is expanded by encoding processing unit 106 and outputted from HDD 13, to printer unit 15 for printing.

When the job requires the input processing and does not require the output processing, or the job completes the input processing before the starting of the output processing, memory control unit 103 switches output buffer 122 to the buffer for use in the input processing as the control described above when the processing of the job is started.

Preferably, when input of the next job is received during the processing of the job being executed which is a job of a kind which requires the input processing and does not require the output processing, and further the input processing having been performed with use of output buffer 122 at the time of reception of input of the next job, in other words, transfer of the image data, having been stored in output buffer 122 at the time of reception of the next job, to HDD 13 is completed, memory control unit 103 releases output buffer 122 from the job being executed and switches it to a buffer for use in the processing of the next job. On the other hand, when input of the next job is received during the processing of a job of a kind which completes the input processing prior to the starting of the output processing of, for example, a copy booklet as the job being executed, memory control unit 103 releases output buffer 122 and switches to a buffer for the next job after completing the processing of the job being processed.

It should be note that, when the next job is associated with the facsimile reception (when received facsimile data is included), memory control unit 103 switches output buffer 122 to a buffer for use in the job being executed and a buffer for use in the processing of the next job which is facsimile reception at each time the reception for one page is completed in accordance with completion of the input processing performed with use of output buffer 122 at that time.

Encoding processing unit 106 encodes inputted image data and delivers the coded data (image data) to input processing unit 104. Input processing unit 104 transfers the coded data (image data) to input buffer 121 and then transfers the same to image storage unit 131 which is a storage area of HDD 13 for image data. Input processing unit 104 transfers coded data (image data) also to output buffer 122 in accordance with a control of memory control unit 103 and then transfers the same to image storage unit 131 as a storage area of HDD 13 for image data.

Output processing unit 105 outputs coded data (image data) designated by HDD 13 through output buffer 122 and delivers it to encoding processing unit 106. Encoding processing unit 106 delivers image data obtained by expanding the coded data to image output unit 107.

<Operation Flow>

FIGS. 5 to 7 are flowcharts representing a specific example of the operation of MFP 100 according to the present embodiment. The operation represented by the flowcharts of FIGS. 5 to 7 are achieved by CPU 10 of MFP 100 reading the program stored in ROM 11 onto RAM 12 and executing the program to exercise each function of FIG. 4.

Firstly, referring to FIG. 5, after receiving an input of a job (YES in Step S101), and when there is no active job at the time of input (NO in Step S103), CPU 10 determines a necessity of the input processing, a necessity of the output processing, and a timing of the input processing and the output processing for the received job.

When the received job is a job which completes the input processing prior to the starting of the output processing (YES in S105), CPU 10 switches output buffer 122 to a buffer for use the input processing of the job (Step S107), and reserves input buffer 121 and output buffer 122 for use in the input processing of the job (Step S109). Then, CPU 10 executes the input processing of the job (Step S111).

When the input processing is completed (YES in Step S113), CPU 10 switches output buffer 122 to a buffer for the output processing (Step S115), and reserves output buffer 122 for use in the output processing (Step S117). Then, CPU 10 executes the processing of the job (output processing, printing processing, and the like) (Step S119).

It should be noted that when the received job requires the input processing and does not require the output processing (YES in Step S114), CPU 10 executes the Steps S107 to S113 of the processing described above and skips the subsequent processing.

When the received job is a job which performs the input processing and the output processing in parallel (NO in Step S105, and YES in Step S121), CPU 10 reserves input buffer 121 for use in the input processing of the job, and switches output buffer 122 to a buffer for the output processing to reserve a buffer for the output processing of the job (Step S123), and executes the processing of the job (Step S119).

When the received job includes only the output processing without the input processing (NO in Step S105, and NO in Step S121), CPU 10 executes the processing subsequent to Step S117 described above. Then, CPU 10 returns the processing to the initial step, and performs the processing for the next job.

When there is already a job being executed at the time of reception of an input of the job (YES in Step S103), in other words, when the received job corresponds to the "next job" according to the description above, referring to FIG. 6, CPU 10 determines a necessity of the input processing a necessity of the output processing, and a timing of the input processing and the output processing for the received job and the job being executed, respectively.

When the received job is a job which completes the input processing prior to starting of the output processing (YES in Step S131), and the job being executed is a job which performs only the input processing and does not perform the output processing (YES in Step S133), and the received job is not associated with the facsimile reception (NO in Step S135), CPU 10 waits for completion of the transfer of image data of the job being executed stored in output buffer 122 to HDD 13 (YES in Step S137), and releases output buffer 122 from the job being executed and reserves it for the processing of the received job (Step S139). Then, CPU 10 executes the processing of the received job (Step S119).

When the received job is associated with the facsimile reception (YES in Step S135), or when the job being executed is a job which completes the input processing prior to the starting of the output processing (NO in Step S133, and YES in Step S143), and the received job is associated with the facsimile reception (YES in Step S145), CPU 10, after receiving one page of facsimile (Step S147), waits for completion of the transfer of image data of the job being executed stored in output buffer 122 at that time to HDD 13 (YES in Step S149), and releases output buffer 122 from the job being executed and reserves a buffer for processing of the job according to the facsimile reception (Step S151). Then, CPU 10 executes the processing of the job for one page of received facsimile (Step S153). After that, CPU 10 releases output buffer 122 from a buffer for use in the job associated with the facsimile reception and reserves a buffer for use in the original job being executed (Step S155), and performs the processing of the job. Then, after completing the processing for one page of received facsimile (YES in Step S157), CPU 10 returns the processing to the initial step and performs the processing for next one page. In other words, CPU 10 repeats the processing of Steps S147 to S155 described above at each time when one page of facsimile is received.

Referring to FIGS. 6 and 7, when the job being executed is a job which performs the input processing and the output processing in parallel (NO in Step S143, and YES in Step S161), and the received job is not associated with the facsimile reception (NO in Step S163), CPU 10 waits for completion of the transfer of the image data stored in output buffer 122 to HDD 13 (YES in Step S165), and releases output buffer 122 from the job being executed and reserves it for the processing of the received job (Step S167). Then, CPU 10 executes the processing of the received job (Step S119). When the received job is associated with the facsimile reception (YES in Step S163), CPU 10 executes the processing subsequent to Step S147 described above.

When the job being executed includes only the output processing without the input processing (NO in Step S161), CPU 10 skips Steps S163 to S165 described above, and releases output buffer 122 from the job being executed and reserves a buffer for use in the processing of the received job (Step S167). Then, CPU 10 executes the processing of the received job (Step S119).

Referring to FIGS. 6 and 7, when the received job is a job which performs the input processing and the output processing in parallel (NO in Step S131, and YES in Step S171), CPU 10 waits for releasing of input buffer 121 from a buffer for the job being executed (YES in Step S173), and reserves input buffer 121 for the received job (Step S175). Moreover, CPU 10 waits for releasing of output buffer 122 from a buffer for use in the processing of the job being executed (YES in Step S177), and reserves output buffer 122 for the received job (Step S179). Then, CPU 10 executes the processing of the received job (Step S119).

<Effects of the Embodiment>

By MFP 100 according to the present embodiment operated as described above, when the processing of storing data to HDD 13 as a secondary storage device is performed, and the job is not a job which starts output processing prior to termination of the input processing, input buffer 121 and output buffer 122 as a primary buffer for the output processing are used as toggle buffers. Accordingly, MFP 100 can shorten the processing time for the input processing to thereby shorten the time for the whole processing, thereby improving the processing performance.

Further, MFP 100 releases output buffer 122, which has been used for the input processing of the job being executed, in accordance with a kind of the next job, so that the starting of the processing of the next job can be made earlier. Accordingly, MFP 100 can shorten the processing time as a whole, thereby improving the processing performance.

Other Example

Further, a program for allowing CPU 10 of MFP 100 to execute the processing described above can be provided. Such a program can be provided as a program product by storing a program to computer-readable storage mediums such as a flexible disk, a CD-ROM (Compact Disk-Read Only Memory), an ROM, an RAM, and a memory card attached to a computer. Alternatively, the program can be provided by storing it to a recording medium such as a hard disk provided in a computer. Moreover, the program can be provided by downloading through a network.

Such a program is provided, so that the processing described above is executed on a general-purpose MFP having a mass storage device such as an HDD or an SSD as a secondary storage device mounted therein to serve as MFP 100.

It should be noted that the program according to the present disclosure may be the one which allows a necessary module among program modules provided as a part of an operating system (OS) of a computer to be called and processed at a predetermined arrangement and at a predetermined timing. In that case, the program itself does not include the module described above, and the processing is executed in cooperation with an OS without including the module. The program which does not include such a module may be also included in a program according to the present disclosure.

Moreover, the program according to the present disclosure may be provided by incorporating it to a part of other program. Also in such a case, the program itself does not include the module included in other program described above, and the processing is executed in cooperation with other program. Such a program incorporated in other program is included in the program according to the present disclosure.

The provided program product is executed by installing it into a program storage unit such as a hard disk. It should be noted that the program product includes the program itself and a recording medium storing the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
a primary storage device;
a secondary storage device;

an input unit capable of receiving an input of a job; and
a controller,
said controller executing:
  determining a necessity of an input processing of image data into said secondary storage device, a necessity of an output processing of image data from said secondary storage device, and a timing of said input processing and said output processing in each of a job being executed and a next job; and
  switching a function of a single output buffer, which is an area set in said primary storage and is used for an output processing of image data from said secondary storage device, between (i) use in said input processing, and (ii) use in said output processing, in accordance with a result of the determination in said determining.

2. The image forming apparatus according to claim 1, wherein
  when said job being executed requires said input processing and does not require said output processing, or when said job being executed completes said input processing prior to starting of said output processing, said switching includes switching the function of said output buffer to use in said input processing at a time of starting the processing of said job being executed.

3. The image forming apparatus according to claim 2, wherein
  when an input of said next job is received during a processing of a job which requires said input processing and does not require said output processing, said switching further includes switching the function of said output buffer to use in a processing of said next job when said input processing having been performed with use of said output buffer at the time of reception of an input of said next job is completed.

4. The image forming apparatus according to claim 3, wherein
  said input unit includes a facsimile receiving unit, and
  when said next job is facsimile data, said switching includes switching the function of said output buffer to use in processing of said next job at each time when said facsimile receiving unit receives one page of facsimile data, and switching the function of said output buffer to use in processing of said job being executed at each time when the processing of said one page is completed.

5. The image forming apparatus according to claim 2, wherein
  when an input of said next job is received during the processing of a job which completes said input processing prior to starting of said output processing, said switching further includes switching the function of said output buffer to use in processing of said next job when a processing of a job being processed is completed.

6. The image forming apparatus according to claim 5, wherein
  said input unit includes a facsimile receiving unit, and
  when said next job is facsimile data, said switching includes switching the function of said output buffer to use in processing of said next job at each time when one page of facsimile data is received by said facsimile receiving unit, and switching the function of said output buffer to use in processing of said job being processed at each time when processing of said one page is completed.

7. The image forming apparatus according to claim 1, further comprising:

a storage device that stores the job being executed, the next job, and information defining a control of the output buffer for each kind of job.

8. A method for controlling an image forming apparatus, said image forming apparatus capable of performing a job processing with input and output of image data with respect to a secondary storage device,
said method comprising:
  receiving an input of a job;
  determining a necessity of an input processing of image data into said secondary storage device, a necessity of an output processing of image data from said secondary storage device, and a timing of said input processing and said output processing in each of a job being executed and a next job; and
  switching a function of a single output buffer, which is set an area in a primary storage device of said image forming apparatus and is used for an output processing of image data from said secondary storage device, between (i) use in said input processing, and (ii) use in said output processing, in accordance with a determination in said determining.

9. The method of claim 8, wherein
  when said job being executed requires said input processing and does not require said output processing, or when said job being executed completes said input processing prior to starting of said output processing, said switching includes switching the function of said output buffer to use in said input processing at a time of starting the processing of said job being executed.

10. The method of claim 9, wherein
  when an input of said next job is received during a processing of a job which requires said input processing and does not require said output processing, said switching further includes switching the function of said output buffer to use in a processing of said next job when said input processing having been performed with use of said output buffer at the time of reception of an input of said next job is completed.

11. The method of claim 10, wherein
  when said next job is facsimile data, said switching includes switching the function of said output buffer to use in processing of said next job at each time when one page of facsimile data is received, and switching the function of said output buffer to use in processing of said job being executed at each time when the processing of said one page is completed.

12. The method of claim 9, wherein
  when an input of said next job is received during the processing of a job which completes said input processing prior to starting of said output processing, said switching further includes switching the function of said output buffer to use in processing of said next job when a processing of a job being processed is completed.

13. The method of claim 12, wherein
  when said next job is facsimile data, said switching includes switching the function of said output buffer to use in processing of said next job at each time when one page of facsimile data is received, and switching the function of said output buffer to use in processing of said job being processed at each time when processing of said one page is completed.

14. The method of claim 8, further comprising:
  storing the job being executed, the next job, and information defining a control of the output buffer for each kind of job.

15. A non-transitory computer-readable storage medium storing a program for allowing a computer, which is mounted to an image forming apparatus capable of performing a job processing with input and output of image data with respect to a secondary storage device, to execute a buffer switching processing, said processing allowing said computer to execute:

receiving an input of a job;

determining a necessity of an input processing of image data into said secondary storage device, a necessity of an output processing of image data from said secondary storage device, and a timing of said input processing and said output processing in each of a job being executed and a next job; and switching a function of a single output buffer, which is an area set in a primary storage of said image forming apparatus and is used for an output processing of image data from said secondary storage device, between (i) use in said input processing, and (ii) buffer for use in said output processing, in accordance with a result of determination in said determining.

16. The non-transitory computer-readable storage medium of claim 15, wherein when said job being executed requires said input processing and does not require said output processing, or when said job being executed completes said input processing prior to starting of said output processing, said switching includes switching the function of said output buffer to use in said input processing at a time of starting the processing of said job being executed.

17. The non-transitory computer-readable storage medium of claim 16, wherein when an input of said next job is received during a processing of a job which requires said input processing and does not require said output processing, said switching further includes switching the function of said output buffer to use in a processing of said next job when said input processing having been performed with use of said output buffer at the time of reception of an input of said next job is completed.

18. The non-transitory computer-readable storage medium of claim 17, wherein when said next job is facsimile data, said switching includes switching the function of said output buffer to use in processing of said next job at each time when one page of facsimile data is received, and switching the function of said output buffer to use in processing of said job being executed at each time when the processing of said one page is completed.

19. The non-transitory computer-readable storage medium of claim 16, wherein when an input of said next job is received during the processing of a job which completes said input processing prior to starting of said output processing, said switching further includes switching the function of said output buffer to use in processing of said next job when a processing of a job being processed is completed.

20. The non-transitory computer-readable storage medium of claim 19, wherein when said next job is facsimile data, said switching includes switching the function of said output buffer to use in processing of said next job at each time when one page of facsimile data is received, and switching the function of said output buffer to use in processing of said job being processed at each time when processing of said one page is completed.

21. The non-transitory computer-readable storage medium of claim 15, further comprising:

storing the job being executed, the next job, and information defining a control of the output buffer for each kind of job.

* * * * *